United States Patent [19]
Ito et al.

[11] Patent Number: 6,123,183
[45] Date of Patent: Sep. 26, 2000

[54] ROTATION TRANSMISSION DEVICE

[75] Inventors: Kenichiro Ito; Makoto Yasui; Koichi Okada; Shiro Goto, all of Shizuoka, Japan

[73] Assignee: NTN Corporation, Osaka, Japan

[21] Appl. No.: 09/198,516

[22] Filed: Nov. 24, 1998

[30]     Foreign Application Priority Data

Nov. 26, 1997  [JP]  Japan ................................... 9-324373
Nov. 26, 1997  [JP]  Japan ................................... 9-324412

[51] Int. Cl.$^7$ .................................................. B60K 23/08
[52] U.S. Cl. ........................... 192/220; 192/222; 192/35; 192/38; 192/52.4
[58] Field of Search ................................. 192/218, 220, 192/222, 35, 37, 38, 44, 52.4

[56]              References Cited

U.S. PATENT DOCUMENTS

| 3,300,002 | 1/1967 | Roper ......................................... 192/35 |
| 3,907,083 | 9/1975 | Nieder ........................................ 192/35 |
| 4,030,581 | 6/1977 | Giometti ................................. 192/38 X |
| 4,377,223 | 3/1983 | Sakakiyama et al. ............. 192/52.4 X |
| 4,509,091 | 4/1985 | Booth .................................. 192/52.4 X |
| 4,629,041 | 12/1986 | Malherbe ............................. 192/222 X |
| 5,275,261 | 1/1994 | Vranish .................................. 192/44 X |
| 5,348,126 | 9/1994 | Gao ........................................ 192/44 X |

*Primary Examiner*—Richard M. Lorence
*Attorney, Agent, or Firm*—Wenderoth, Lind & Ponack, L.L.P.

[57]              ABSTRACT

A rotation transmission device including a clutch having an inner member, an outer ring, and engaging elements provided between the inner member and the outer ring for selective transmission and shutoff of rotation power between the inner member and the outer ring, and an electromagnetic clutch having an electromagnetic coil for locking and disengaging the clutch. When the clutch is not engaged, a current of a lower level than required to lock the clutch is supplied to the electromagnetic coil of the electromagnetic clutch to shorten the response time. In another method, when DIRECT-CONNECT 4WD mode is selected, a current is intermittently supplied to an electromagnetic coil to reduce power consumption and heat buildup.

15 Claims, 6 Drawing Sheets

ROTATION TRANSMISSION DEVICE

BACKGROUND OF THE INVENTION

This invention relates to a rotation transmission device mounted on a drive train of a motor vehicle for changeover between transmission and shutoff of the driving force.

When a four-wheel drive vehicle turns on a paved road with the front and rear wheels directly coupled together, the vehicle will experience a negative phenomenon known as tight corner braking. In order to prevent such a problem, the applicant of this invention proposed rotation transmission devices including a roller type two-way clutch and an electromagnetic coil in unexamined Japanese patent publication 10-71872.

FIGS. 1 and 2 show a rotation transmission device A of this type, which is a part of a transfer case 5 of an FR-based 4WD vehicle having hub clutches 2 at the outer ends of front wheels 1. The transfer case 5 includes an input shaft 6 through which the output of a transmission 4 coupled to an engine 3 is delivered directly to a propeller shaft 8 for rear vehicle wheels 7, and a chain sprocket 9 coaxially and relatively rotatably mounted on the input shaft 6. The rotation transmission device A includes a roller-engage type two-way clutch 10 for selectively transmitting the rotation force from the input shaft 6 to the chain sprocket 9, and an electromagnetic clutch 11 for selectively locking and unlocking the two-way clutch 10. The rotation transmission device adds a 4WD control mode (AUTO-MODE) to the drive modes available in the typical part-time 4WD vehicle (which are 2WD, 4WD-Hi and 4WD-Lo).

FIGS. 3A and 3B show in detail the two-way clutch 10 and the electromagnetic clutch 11 of the rotation transmission device A. The two-way clutch 10 includes an inner member 12 and an outer ring 13 coaxially and relatively rotationally mounted around the inner member 12 through bearings. One of the inner and outer members 12, 13 is formed with a plurality of cam faces 14, while the other is formed with a cylindrical surface 15 opposite the cam faces 14 to define a wedge-like space therebetween. Mounted in the wedge space is a retainer 16 having a plurality of pockets each accommodating a roller 17 as an engaging element. The rollers 17 are biased toward a neutral position, i.e. a position in which they do not engage the cylindrical surface 15 or the cam faces 14, by a switch spring 18 having ends thereof engaged by the retainer 16 and one of the inner member 12 and the outer ring 13 that is formed with the cam faces 14.

The electromagnetic clutch 11 comprises a friction flange 19 fixed to the outer ring 13 or the inner member 12, an armature 20 mounted on an end of the retainer 16 so as to be slidable but not rotatable relative to the retainer 16 and to be in juxtaposition with the friction flange 19 with a suitable clearance present therebetween, and an electromagnetic coil 21 for magnetically pressing the friction flange 19 and the armature 20 against each other. Thus, by activating and deactivating the electromagnetic coil 21, the rollers 17 engage and disengage.

In such a system, it is desired that when AUTO-MODE is selected with a mode changeover switch 22, the two-way clutch 10 is locked as quickly as possible when an ECU 23 (electronic control unit) begins to apply a voltage to the electromagnetic coil 21.

FIG. 7 shows the time lag between the activation of the electromagntic clutch 11 and the locking of the two-way clutch 10 in a conventional system. The electromagnetic coil 21 begins to produce an electromagnetic force slightly after point of time t0, i.e. the time when the ECU 23 detects slippage of one of the rear wheels and begins to apply a voltage to the electromagnetic coil 21. As the electromagnetic force increases with time, the frictional torque produced between the armature 20 and the friction flange 19 increases, and when the frictional torque exceeds the torque of the switch spring 18 in the two-way clutch 10, the clutch is locked.

In the conventional control method, it takes a long time before the two-way clutch locks after the ECU 23 detects slippage. Due to this delay in response, if the vehicle is started sharply quickly on a low-friction $\mu$ road such as on a frozen or otherwise slippery road, the rotation speed difference between front wheels 1 and rear wheels 7 will widen by the time the two-way clutch 10 locks. As a result, when the two-way clutch 10 locks belatedly, a large shock is inflicted on the vehicle.

An object of this invention is to provide a rotation transmission device which can prevent a large shock when the vehicle is started quickly on a low-$\mu$ road.

To shorten the response time from the detection of a slip by the ECU 23 to the lockup of the two-way clutch 10, a large current has to be supplied to the electromagnetic coil. The use of a high-power electromagnetic coil is, thus, unavoidable.

In a conventional control method, when the travel mode has been changed over to the LOCK mode, a voltage (say 12 V) is constantly applied to the electromagnetic coil. Thus, during the LOCK mode, the power consumption and heat buildup are large.

Another object of this invention is to provide a system for controlling a rotation transmission device which consumes less power during the LOCK mode, and which is turned off while the parking brake is applied, thereby reducing the power consumption as a whole.

SUMMARY OF THE INVENTION

According to this invention, there is provided a rotation transmission device comprising a clutch including an inner member, an outer ring, and engaging elements provided between the inner member and outer ring for selective transmission and shutoff of rotation power between the inner member and outer ring. A control means for locking and freeing the clutch, such that when the clutch is not engaged, a current of a lower level than required to lock the clutch is supplied to the electromagnetic coil of the electromagnetic clutch.

Also, in order to solve the second object, according to the present invention, a current is supplied intermittently to the control unit during the LOCK mode.

Other features and objects of the present invention will become apparent from the following description made with reference to the accompanying drawings, in which:

DETAILED DESCRIPTION OF THE PREFERRED EMBODIMENT

An embodiment of this invention is described with reference to the drawings.

Figure 1:
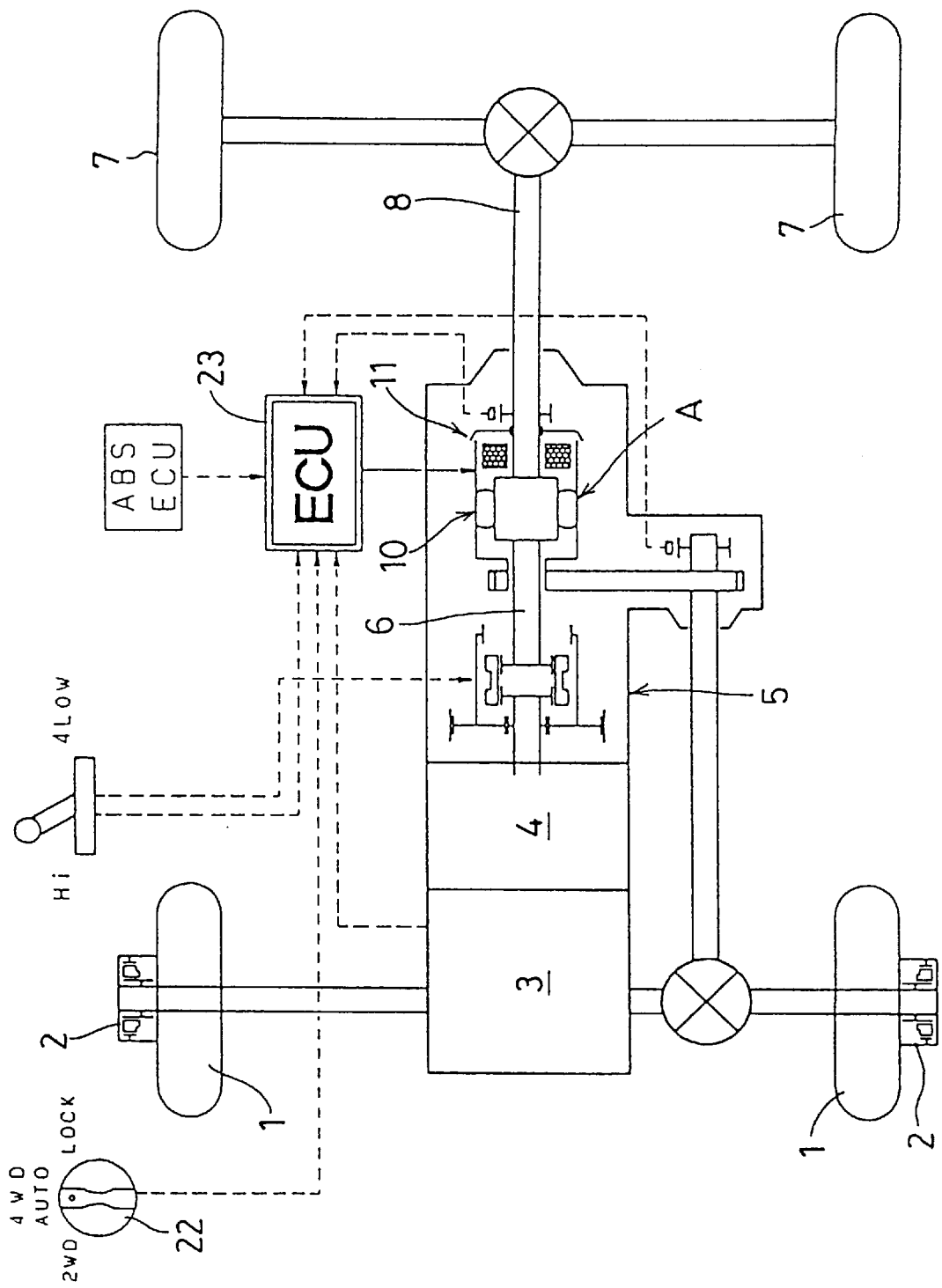
FIG. 1 is a plan view showing the layout of a 4WD vehicle having a rotation transmission device.
Figure 2:
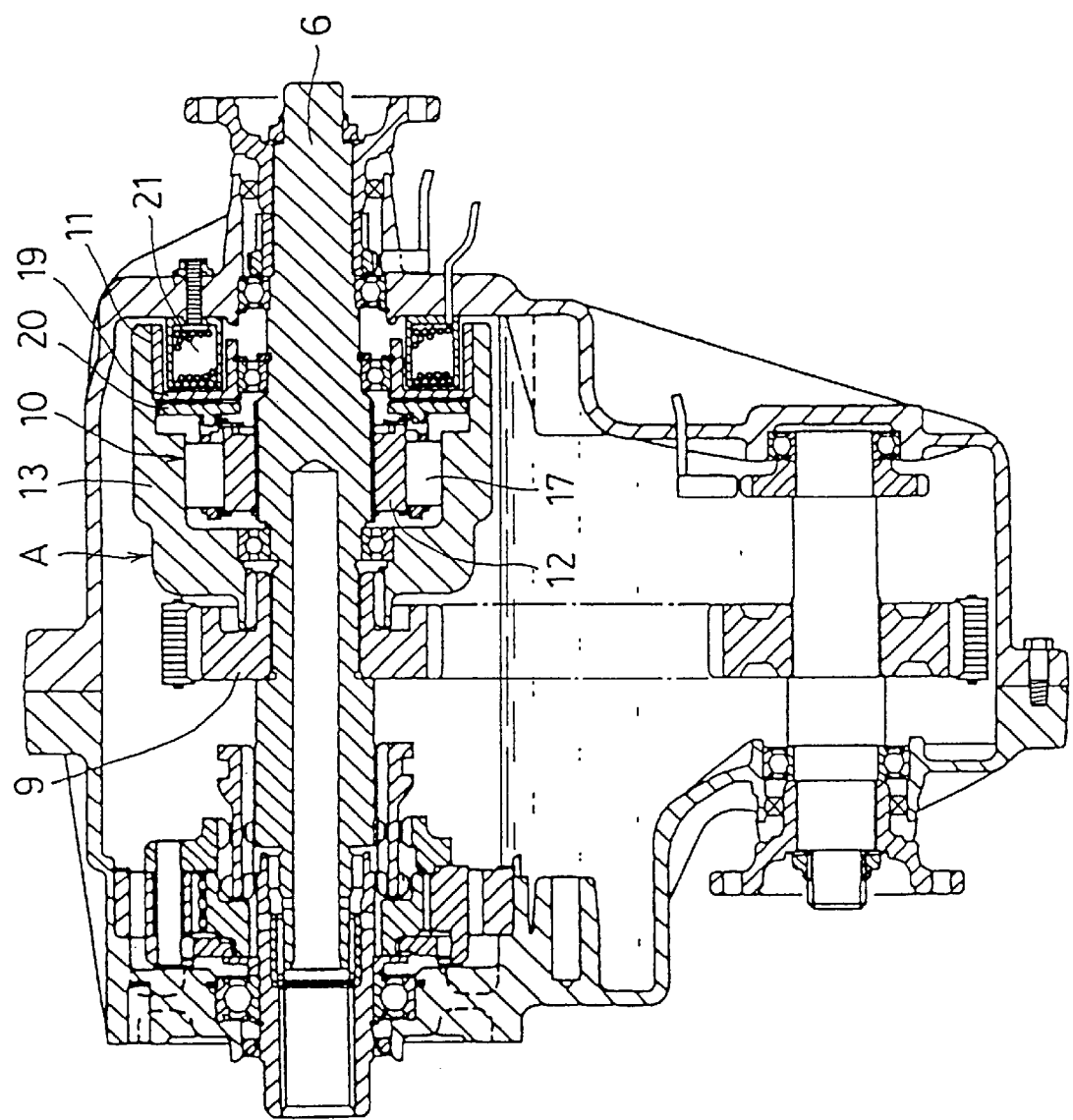
FIG. 2 is a sectional view of a transfer case including a rotation transmission device.
Figure 3A:
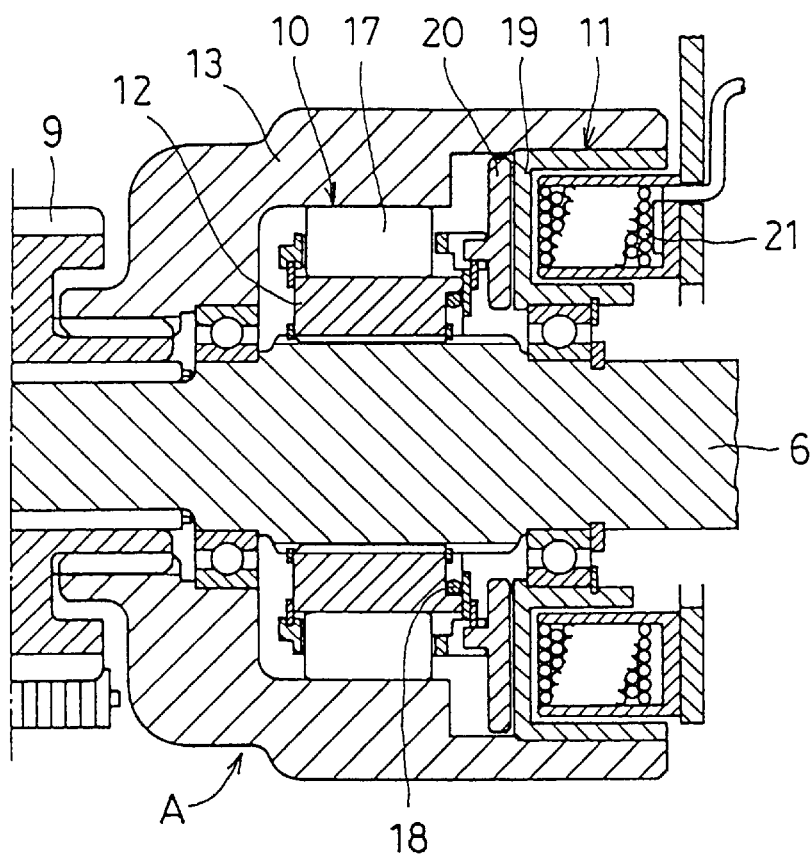
FIG. 3A is a vertical sectional front view of the rotation transmission device.
Figure 3B:
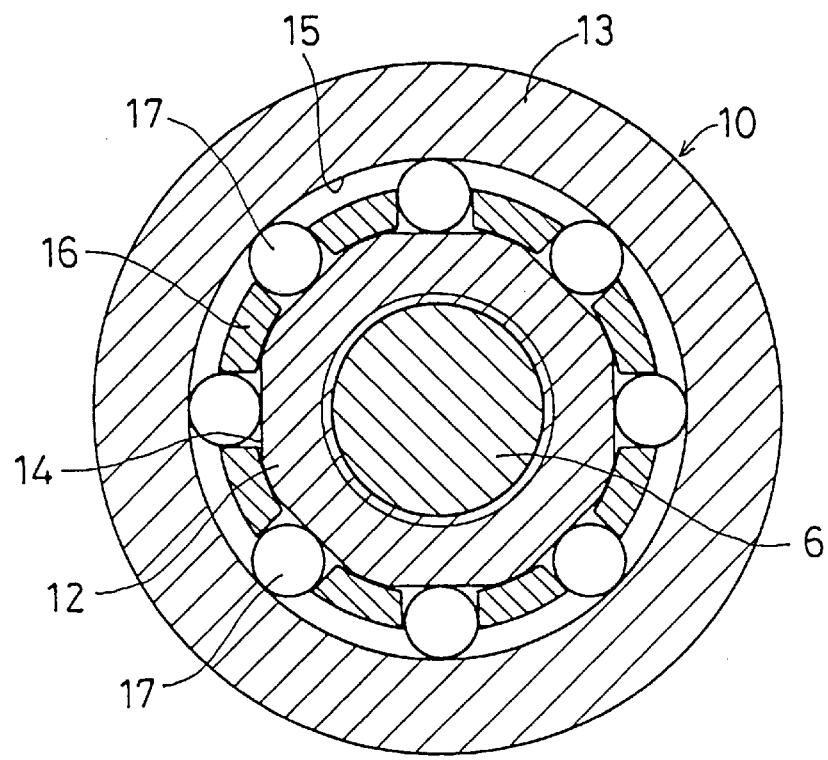
FIG. 3B is a vertical sectional side view of the same.

The structure of the rotation transmission device A is as shown in FIGS. 1–3. According to the control method of this invention, a small amount of preliminary current is supplied to an electromagnetic coil 21 of an electromagnetic clutch 11 in the rotation transmission device A, even while no slipping of the rear wheels is detected, by an ECU 23 to shorten the response time from the detection of wheel slip to the lockup of a two-way clutch 10 and, thus to lessen the shock when the clutch is locked.

Figure 5:
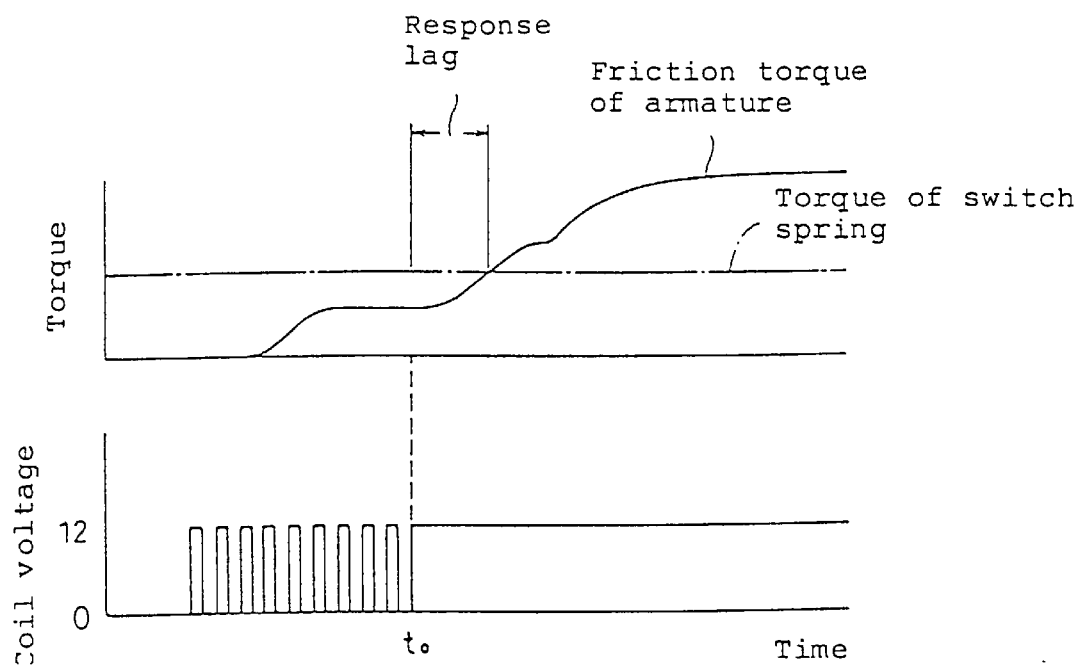
FIG. 5 is a view showing the relationship between the activation of an electromagnetic coil and the torque in the control method.

The preliminary current is produced by a pulse width modulating means (PWM) as shown in FIG. 5. Such pre-charging is needed only while the vehicle is moving at a slow speed or is stopped, because during medium to high speed travel, the rotation speed is less likely to change quickly, so the clutch can be locked smoothly without supplying a preliminary current. Pre-charging only during low-speed travel or at a stop is advantageous from an energy-saving viewpoint, as well.

The preliminary current supplied to the electromagnetic coil 21 is adjusted by a pulse width adjusting means to such a level that the frictional force produced between an armature 20 and a friction flange 19, due to its electromagnetic force, is smaller than the torque of a switch spring 18 of the two-way clutch 10. In this state, the two-way clutch 10 can idle, so that no tight corner braking will occur.

According to this invention, a preliminary current is supplied to the electromagnetic coil 21, as shown in FIG. 5, during low-speed travel or at a stop with a mode changeover switch 22 set at the AUTO-MODE position and the two-way clutch 10 free.

Due to the preliminary current, a frictional torque smaller than the torque of the switch spring 18 is produced between the armature 20 of the electromagnetic clutch 11 and the friction flange 19. However, the two-way clutch 10 can idle, so that no tight corner braking will occur.

In this state, if the vehicle is started quickly on a low-μ road, ECU 23 will detect the slipping and supply a normal current to the electromagnetic coil 21. The electromagnetic force of the coil 21 thus increases, and when the frictional torque between the armature 20 and the friction flange 19 exceeds the torque of the switch spring 18, the two-way clutch 10 is locked. As a result, the drive mode has been changed over to 4WD.

The interval between time t0, when the ECU 23 detects slipping and supplies a normal current to the electromagnetic coil 21, and the time when the frictional torque between the armature 20 and the friction flange 19 exceeds the torque of the switch spring 18 is significantly shortened compared with the conventional arrangements. Since the two-way clutch 10 is locked quickly upon the detection of the slipping, it is possible to lessen the shock and improve the feeling when the vehicle is started.

Figure 6:
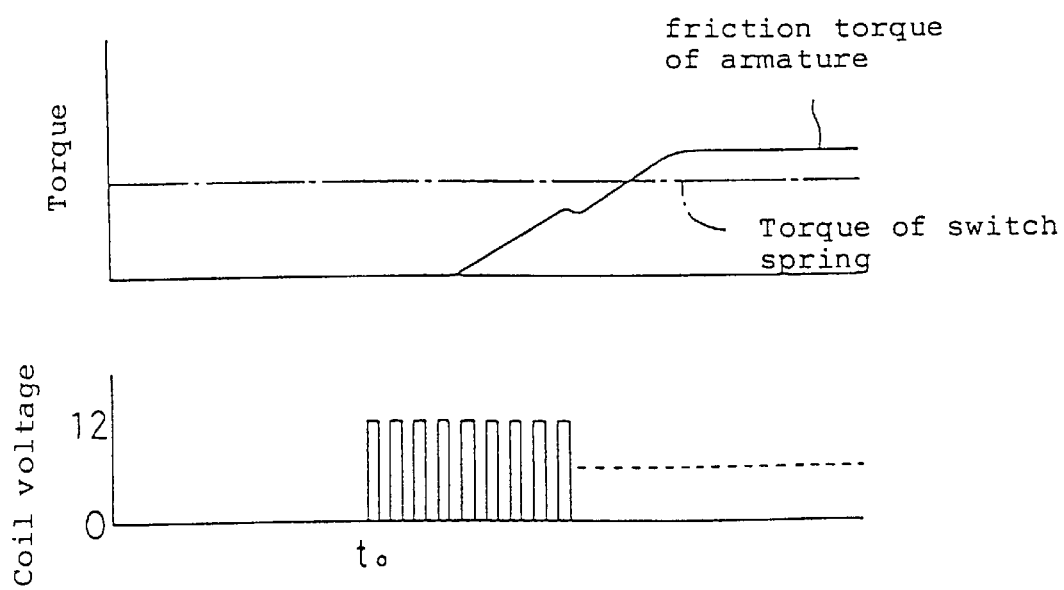
FIG. 6 is a view similar to FIG. 5 showing another control method.
Figure 7:
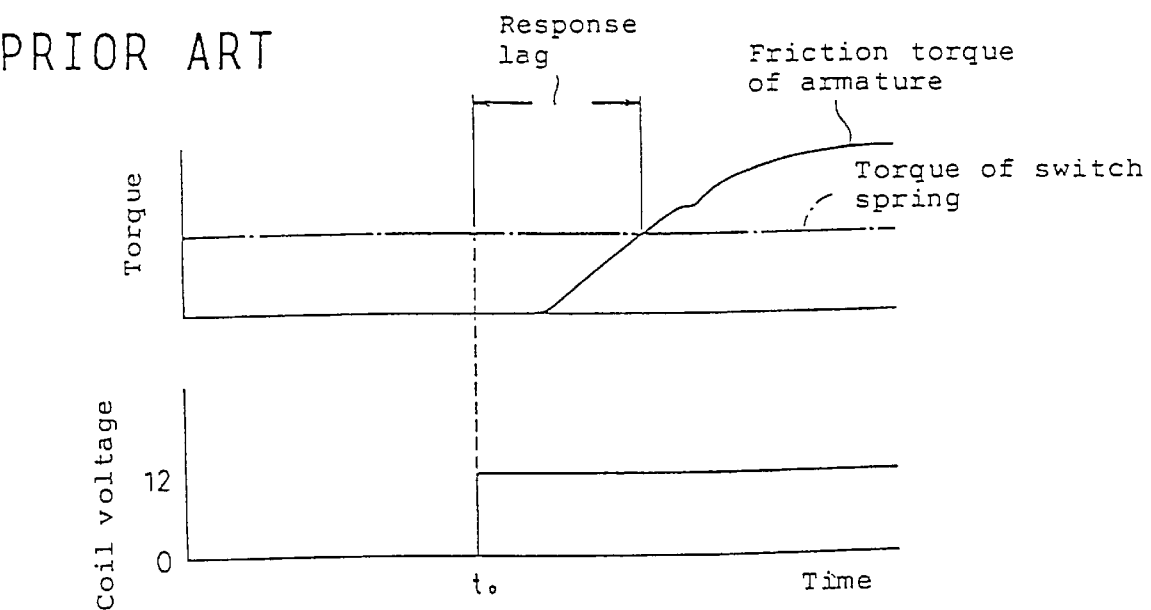
FIG. 7 is a view showing the relationship between the activation of an electromagnetic coil and the torque in a conventional control method.

According to another embodiment of this invention, when the mode changeover switch 22 is at the DIRECT-CONNECT 4WD position, a current is supplied intermittently to the electromagnetic coil 21 of the electromagnetic clutch 11. As shown in FIG. 6, the level of the current is limited by a pulse width modulating means PWM to such a level that the frictional force produced between the friction flange 19 and the armature 20 slightly overcomes the torque of the switch spring 18.

Since responsiveness does not matter during the DIRECT-CONNECT 4WD travel (LOCK MODE), the voltage is set at a value such that a frictional force slightly larger than the torque of the switch spring 18 is produced. Thus, by the control of the pulse width modulating means, the pulse duty ratio is reduced to obtain the same result as reducing the voltage.

This results in reduced power consumption as compared with continuously supplying a voltage of 12 V. For example, by adjusting the pulse width, it is even possible to reduce the power consumption by half, i.e. to 6 V power consumption.

Figure 4:
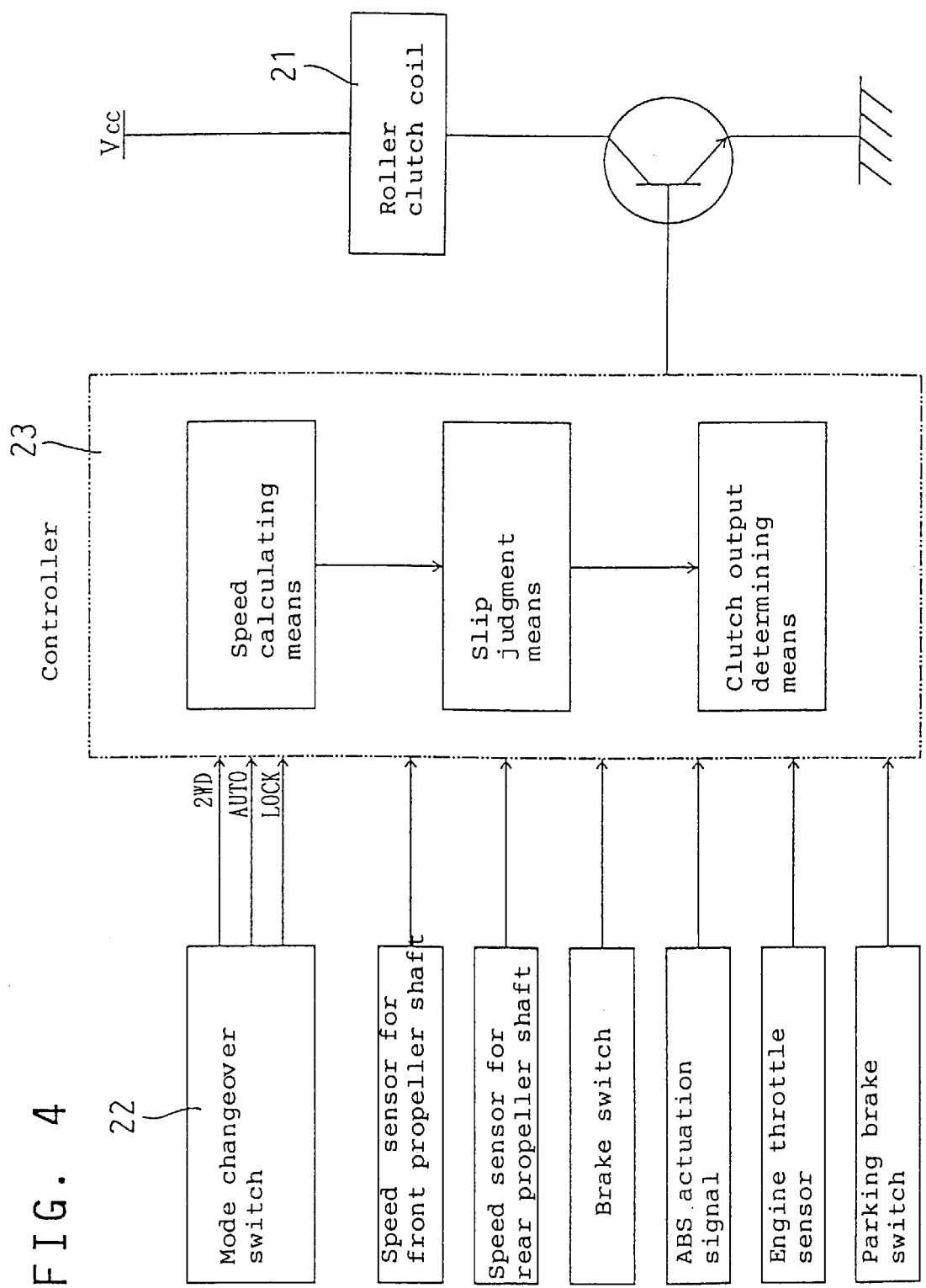
FIG. 4 is a block diagram showing a method of controlling the rotation transmission device according to the present invention.

As shown in FIG. 4, in the above control system, a parking brake signal may be inputted into the controller to cut off the current supply to the electromagnetic coil 21 even during the DIRECT-CONNECT 4WD mode, thereby further reducing power consumption.

According to this invention, when the mode changeover switch 22 is changed over to the DIRECT-CONNECT 4WD mode while the vehicle is moving, a pulse current is supplied to the electromagnetic coil 21 through the pulse modulating means. When the frictional force produced between the friction flange 19 and the armature 20, due to the current, overcomes the torque of the switch spring 18, the drive mode changes over to the 4WD mode. Namely, the front and rear vehicle wheels are directly coupled together. During such DIRECT-CONNECT 4WD mode, the electromagnetic coil 21 is normally energized. But by applying a pulse current, the power consumption and the heat buildup decrease substantially.

What is claimed is:

1. A rotation transmission device for a vehicle, comprising:
   a first clutch including an inner member, an outer ring, and a plurality of engaging elements provided between said inner member and said outer ring for selective transmission and shutoff of rotation power between said inner member and said outer ring;
   an electromagnetic clutch including an electromagnetic coil for locking and disengaging said first clutch; and
   a controller for selectively supplying a first non-zero current and a second non-zero current to said electromagnetic clutch, wherein the first non-zero current is at a current level which is different than said second non-zero current, wherein the first non-zero current is sufficient to pre-charge said electromagnetic coil, but is insufficient to cause said electromagnetic clutch to lock said first clutch, and wherein said second non-zero current is sufficient to cause said electromagnetic clutch to lock said first clutch.

2. The rotation transmission device for a vehicle, as claimed in claim 1, wherein said inner member and said outer ring are coaxially and rotatably connected to each other via bearings.

3. The rotation transmission device for a vehicle, as claimed in claim 1 wherein said first clutch further comprises:
   a plurality of cam faces formed on one of said inner member and said outer ring;

a cylindrical face located on another of said inner member and said outer ring, such that a wedge-shaped space is defined between said inner member and said outer ring;

a retainer having a plurality of pockets mounted in said wedge-shaped space;

wherein said plurality of engaging elements are located in said plurality of pockets, and said engaging elements comprise rollers; and wherein a resilient member is located between said retainer and said one of said inner member and said outer ring that is formed with said plurality of cam faces to bias said rollers in a neutral position, and said rollers are not engaged with said plurality of cam faces and said cylindrical face.

4. The rotation transmission device for a vehicle, as claimed in claim 3, wherein said electromagnetic clutch further comprises:

a friction flange attached to one of said inner member and said outer ring; and an armature slidably, but not rotatably mounted to an end of said retainer in juxtaposition with said friction flange with a space in between said armature and said friction flange, wherein said armature and said friction flange are magnetically associated with said electromagnetic coil and are arranged such that when said controller supplies the second non-zero current to said electromagnetic coil, said armature and said friction flange press against each other.

5. The rotation transmission device for a vehicle, as claimed in claim 1, wherein said controller further comprises a pulse width modulator which modulates a source voltage to create the first and second non-zero currents.

6. The rotation transmission device for a vehicle, as claimed in claim 4, wherein said controller further comprises a pulse width modulator which modulates a source voltage to create the first and second non-zero currents.

7. The rotation transmission device for a vehicle, as claimed in claim 1, wherein said controller further comprises a vehicle stop input, wherein said controller supplies the first non-zero current to said electromagnetic coil when said vehicle stop input receives a signal that the vehicle is stopped.

8. A rotation transmission device for a vehicle, comprising:

a clutch including an inner member, an outer ring, and a plurality of engaging elements provided between said inner member and said outer ring for selective transmission and shutoff of rotation power between said inner member and said outer ring;

a clutch actuator for locking and disengaging said clutch; and a controller with a plurality of manually selectable travel modes including a normal locking mode, wherein, during the normal locking mode, said controller intermittently supplies a current to said clutch actuator while said clutch actuator continuously locks said clutch.

9. The rotation transmission device for a vehicle, as claimed in claim 8, wherein said inner member and said outer ring are coaxially and rotatably mounted to each other.

10. The rotation transmission device for a vehicle, as claimed in claim 9, wherein said clutch further comprises:

a plurality of cam faces formed on one of said inner member and said outer ring;

a cylindrical face located on another of said inner member and said outer ring, such that a wedge-shaped space is defined between said inner member and said outer ring;

a retainer having a plurality of pockets mounted in said wedge-shaped space;

wherein said plurality of engaging elements are located in said plurality of pockets, and said engaging elements comprise rollers; and wherein a resilient member located between said retainer and said one of said inner member and said outer ring that is formed with said plurality of cam faces to bias said rollers in a neutral position, and said rollers are not engaged with said plurality of cam faces and said cylindrical face.

11. The rotation transmission device for a vehicle, as claimed in claim 10, wherein said clutch actuator further comprises:

a friction flange attached to one of said inner member and said outer ring;

an armature slidably, but not rotatably mounted to an end of said retainer in juxtaposition with said friction flange with a space in between said armature and said friction flange; and an electromagnetic coil magnetically associated with said armature and said friction flange, such that when said controller supplies the current to said electromagnetic coil, said armature and said friction flange press against each other.

12. The rotation transmission device for a vehicle, as claimed in claim 11, wherein said controller further comprises a pulse width modulator which modulates a source voltage to create the current and the current has a value such that, when said controller supplies the current to said clutch actuator, a frictional force is created between said armature and said friction flange which overcomes a torque of said resilient member of said first clutch.

13. The rotation transmission device for a vehicle, as claimed in claim 8, wherein said controller further comprises a parking brake input, wherein said controller cuts off the current supplied to said clutch actuator when said parking brake input receives a signal indicating that a parking brake of the vehicle is on.

14. The rotation transmission device for a vehicle, as claimed in claim 11, wherein said controller further comprises a parking brake input, wherein said controller cuts off the current supplied to said clutch actuator when said parking brake input receives a signal indicating that a parking brake of the vehicle is on.

15. The rotation transmission device for a vehicle, as claimed in claim 12, wherein said controller further comprises a parking brake input, wherein said controller cuts off the current supplied to said clutch actuator when said parking brake input receives a signal indicating that a parking brake the vehicle is on.

* * * * *